Dec. 31, 1929.    A. WHITAKER ET AL    1,742,115

LIGHT CONTROLLING MEANS

Filed Jan. 26, 1929

Inventors,
Alfred Whitaker and
Michael Bowman Manifold,
By Cameron, Kerkam and Sutton.
Attorneys Patented Dec. 31, 1929

1,742,115

UNITED STATES PATENT OFFICE

ALFRED WHITAKER, OF WEST DRAYTON, AND MICHAEL BOWMAN-MANIFOLD, OF HAYES, ENGLAND

LIGHT-CONTROLLING MEANS

Application filed January 26, 1929, Serial No. 335,370, and in Great Britain December 10, 1927.

The present invention relates to means for controlling the intensity of a beam of light in accordance with electrically produced changes in a magnetic field.

A known method of controlling the intensity of a beam of light consists in passing a beam of plane polarized light through a suitable transparent medium situated in a magnetic field. The light is then passed through an analyzing device. When the strength of the magnetic field is changed, for example by passing a current through a suitably arranged coil, a rotation of the plane of polarization of the light passing through the field takes place, and the intensity of the light coming from the analyzing device is therefore changed also. Intensity controlling means of this kind are called Faraday cells.

An objection to the use of means of this type where it is required to transform rapid changes in magnetic field into corresponding changes in light intensity, as for example when dealing with oscillations at acoustic frequencies, is that the response decreases as the frequency increases, due to the fact that the impedance of the device is largely reactive.

In order to overcome this difficulty it has been proposed to utilize high frequency currents modulated with acoustic frequency currents and to feed these modulated high frequency currents to an ascillatory circuit tuned to the frequency of the high frequency oscillations and containing resistance. The coil of the Faraday cell has been used as one element of the oscillatory circuit. The present invention is not concerned with the use of modulated high frequency currents but provides means whereby the response at acoustic frequencies may be made substantially uniform over a wide range of such frequencies.

According to the present invention there is provided a device for controlling the intensity of a beam of polarized light in accordance with acoustic frequency electrical variations in which said electrical variations are passed through a coil and thereby produce corresponding variations in a magnetic field through which said beam of light is passed, wherein electrical correcting means comprising resistance and adapted to increase the relative response at the higher frequencies are included in the circuit between said coil and the source of said electrical variations.

The invention is illustrated in the accompanying drawings in which

Fig. 1 shows a circuit arrangement in accordance with the invention and.

Figure 1:
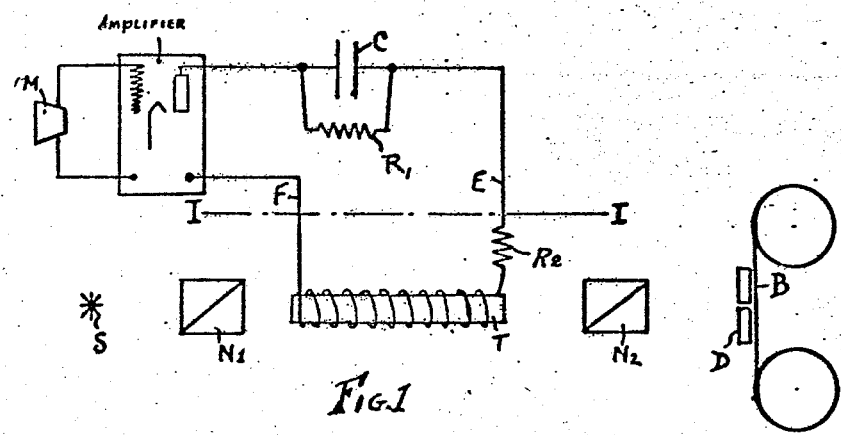

Referring to Fig. 1, a source of electrical variations, which may, for example, be an amplifier having a microphone M in its input circuit, is connected by leads F and E to a Faraday cell through a resistance $R_1$, shunted by a condenser C. The Faraday cell comprises a coil wound upon a tube T of insulating material and has windows at each end. The tube T is filled with a substance which exhibits the Faraday effect, such for example as nitro-benzene. Light from a source S, polarized by a Nicol prism $N_1$, is passed through the tube T, through a second Nicol prism $N_2$ and a slit device D on to a travelling film B. The intensity of the light falling upon the film B will vary according to the instantaneous value of the current in the coil of the Faraday cell.

The winding of the cell will be assumed to have an inductance L and a resistance $R_2$ which includes any resistance external to the winding but effectively in series therewith excluding $R_1$. The device will then have a substantially flat topped characteristic, for a frequency band extending from zero to a value of the order of that at which a circuit consisting only of an inductance L and a capacity C would resonate, if the value of $R_1^2$ lies between $0.4 \frac{L}{C}$ and $0.5 \frac{L}{C}$. When $R_1^2$ lies between these values the series resistance $R_2$ may be made quite low so that a minimum of power is required to operate the device. For higher values of $R_2$ the value of $R_1^2$ may be reduced to $0.3 \frac{L}{C}$ without unduly affecting the response characteristic.

Another method of carrying the invention into effect involves the use of circuits embodying negative resistances and analogous to the networks known as Boucherot network. In the Journal of the Institution of Electrical Engineers for March 1927, Bartlett has pointed out that any so-called Boucherot network embodying pure resistances and pure negative resistances has the property that if a constant A. C. voltage (R. M. S.) be applied across the input, a constant current (R. M. S.) will flow in the terminating impedance whatever the value of this terminating impedance. It will therefore be clear that the use of a terminating impedance which changes with frequency, will not affect the constancy of the current. Any known or suitable device which exhibits negative resistance characteristics over the desired range of current may be used, such for example as certain known forms and arrangements of thermionic valves and tubes adapted for maintaining electrical discharges in gases at low pressure.

Figure 2:
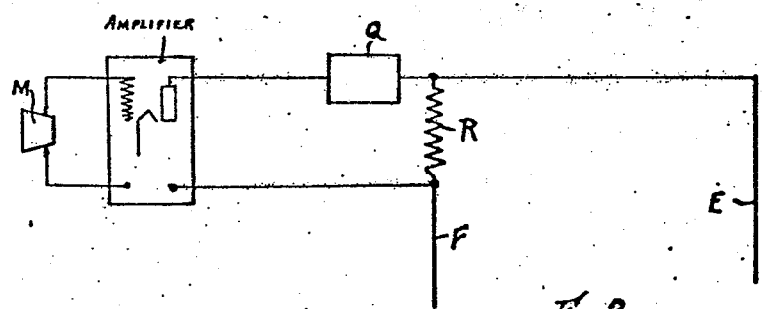
Figs. 2 and 3 show alternative arrangements of that part of the circuit of Fig. 1 which lies above the line 1—1.

A simple arrangement embodying the above principles is shown in Fig. 2. A resistance R is connected in series with a negative resistance Q to a source of electrical variations which may comprise the microphone M and a suitable amplifier as above described. The device Q has the property that, over the range of potential differences to which it is to be subjected, its characteristic curve of current against applied potential difference slopes in the reverse direction to that of a resistance and that, over this range, the slope of the curve is substantially constant and equal to $-\frac{1}{R}$. As an example of a suitable negative resistance device, a four electrode valve having appropriate potential differences maintained between its electrodes may be mentioned. The winding of the Faraday cell is connected across either the positive or the negative resistance and the currents in this winding will accordingly be independent of the variations in its impedance with changes of frequency. In the arrangement shown, the leads E, F are connected to the ends of resistance R.

Since it is difficult in practice to realize negative resistances capable of operating satisfactorily at high current values, an amplifier, such as a thermionic valve amplifier, is preferably included in front of the winding of the Faraday cell. In this case the input of the amplifier is connected across either the positive or the negative resistance and the Faraday cell winding is connected across the output of the amplifier.

In this case it is advantageous to arrange, by suitable proportioning of inductances and resistances, that the impedance looking into the amplifier at the input end shall be proportional at all frequencies to the impedance of the output circuit, consisting of the sum of the impedance looking back into the amplifier and forward into the Faraday cell.

Figure 3:
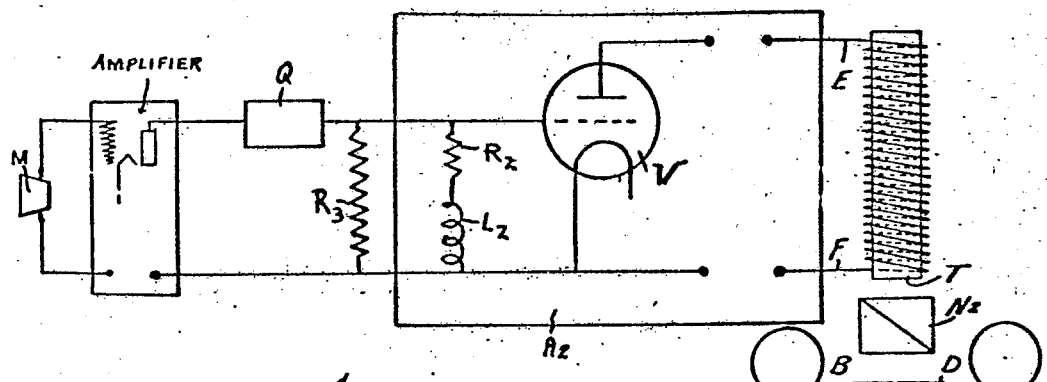

An arrangement having these features is shown in Fig. 3. The negative resistance Q is connected in series between the source of electrical variations and the input terminals of the amplifier arrangement $A_r$. The resistance $R_1$ is connected in shunt with the input terminals of the amplifier arrangement $A_2$ and has a value equal and opposite to Q. Shunted across the grid circuit of the valve V is a combination of impedances comprising a resistance $R_2$ in series with an inductance $L_r$. The resistance $R_2$ and the inductance $L_2$ have such values that their combined impedance bears a constant ratio to the impedance of the output circuit of the amplifier $A_2$ over the range of frequencies at which the device is to operate. The amplifier $A_2$ may comprise any desired number of valves of which only the first valve V, is shown. The leads E, F are intended, as in the other two figures, for connection to a Faraday cell.

We claim:

1. A device for controlling the intensity of a beam of polarized light in accordance with a current of varying frequency comprising a light-controlling valve, said valve including a coil adapted to produce a magnetic field to control the plane of polarization of the light beam, means associated with said coil for supplying a current of varying frequency thereto, and electrical correcting means including resistance in circuit with said coil for increasing the relative response at higher frequencies and maintaining a current through said coil that is independent of variations of the impedance of said coil.

2. A device for controlling the intensity of a beam of polarized light in accordance with a current of varying frequency comprising a light controlling valve, said valve including a coil adapted to produce a magnetic field to control the plane of polarization of the light beam, means for supplying a current of varying frequency to said coil, and electrical correcting means comprising positive and negative resistances for increasing the relative response of said coil at higher frequencies to compensate for variations of the impedance of said coil.

3. A device for controlling the intensity of a beam of polarized light in accordance with a current of varying frequency comprising a light controlling valve, said valve including a coil adapted to produce a magnetic field to control the plane of polarization of the light beam, means for supplying a current of varying frequency to said coil, and electrical correcting means comprising positive and negative resistances for increasing the relative response of said coil at higher frequencies, one of said resistances being connected effectively in series with said coil and the other effectively in shunt with said coil.

4. A device for controlling the intensity of a beam of polarized light in accordance with a current of varying frequency comprising a thermionic valve amplifier adapted to produce an output current of varying frequency, a light controlling valve including a coil connected in the output circuit of said amplifier and adapted to produce a magnetic field to control the plane of polarization of the light beam, and electrical correcting means comprising resistance for maintaining a current through said coil that is independent of variations of impedance of the coil.

5. A device for controlling the intensity of a beam of polarized light in accordance with a current of varying frequency comprising a thermionic valve amplifier adapted to produce an output current of varying frequency, a light controlling valve including a coil connected to the output circuit of said amplifier and adapted to produce a magnetic field to control the plane of polarization of the light beam, and electrical correcting means comprising positive and negative resistances for increasing the relative response of said coil at higher frequencies to compensate for variations of impedance.

6. A device for controlling the intensity of a beam of polarized light in accordance with a current of varying frequency comprising a thermionic valve amplifier adapted to produce an output current of varying frequency, a light controlling valve including a coil connected in the output circuit of said amplifier and adapted to produce a magnetic field to control the plane of polarization of the light beam, and electrical correcting means comprising positive and negative resistances to increase the relative response of said coil at higher frequencies, one of said resistances being effectively in series with said coil and the other being effectively in shunt with said coil.

7. A device for controlling the intensity of a beam of polarized light in accordance with a current of varying frequency comprising a thermionic valve amplifier, means connected in the input circuit of said amplifier adapted to generate a current of varying frequency, a light controlling valve including a coil connected in the output circuit of the amplifier and adapted to produce a magnetic field to control the plane of polarization of the light beam, electrical correcting means comprising positive and negative resistance to increase the relative response of said coil at higher frequencies, and impedance means in shunt with the input circuit of said amplifier, said impedance means having a substantially constant ratio to the impedance of the output circuit of said amplifier in the frequency range.

8. A device for controlling the intensity of a beam of polarized light in accordance with a current of varying frequency comprising a thermionic valve amplifier adapted to produce an output current of varying frequency, a light controlling valve including a coil connected in the output circuit of said amplifier and adapted to produce a magnetic field to control the plane of polarization of the light beams, electrical correcting means to increase the relative response of said coil at higher frequencies, said correcting means comprising positive and negative resistances one effectively in series with said coil and one effectively in shunt with said coil, and impedance means in shunt with the input circuit of said amplifier, said impedance having a substantially constant ratio to the impedance of the output circuit of the amplifier over the frequency range.

In testimony whereof, we have signed our names to this specification at London, England, this 8th day of January, 1929, and at Camden, New Jersey, this 25th day of January, 1929.

MICHAEL BOWMAN-MANIFOLD.
ALFRED WHITAKER.